April 7, 1942.  T. E. PRAY  2,278,796
SLACK OR CUTTINGS REMOVING ATTACHMENT FOR KERF-CUTTING
MACHINES OF THE ROOM AND PILLAR TYPE
Filed Oct. 30, 1940  3 Sheets-Sheet 1
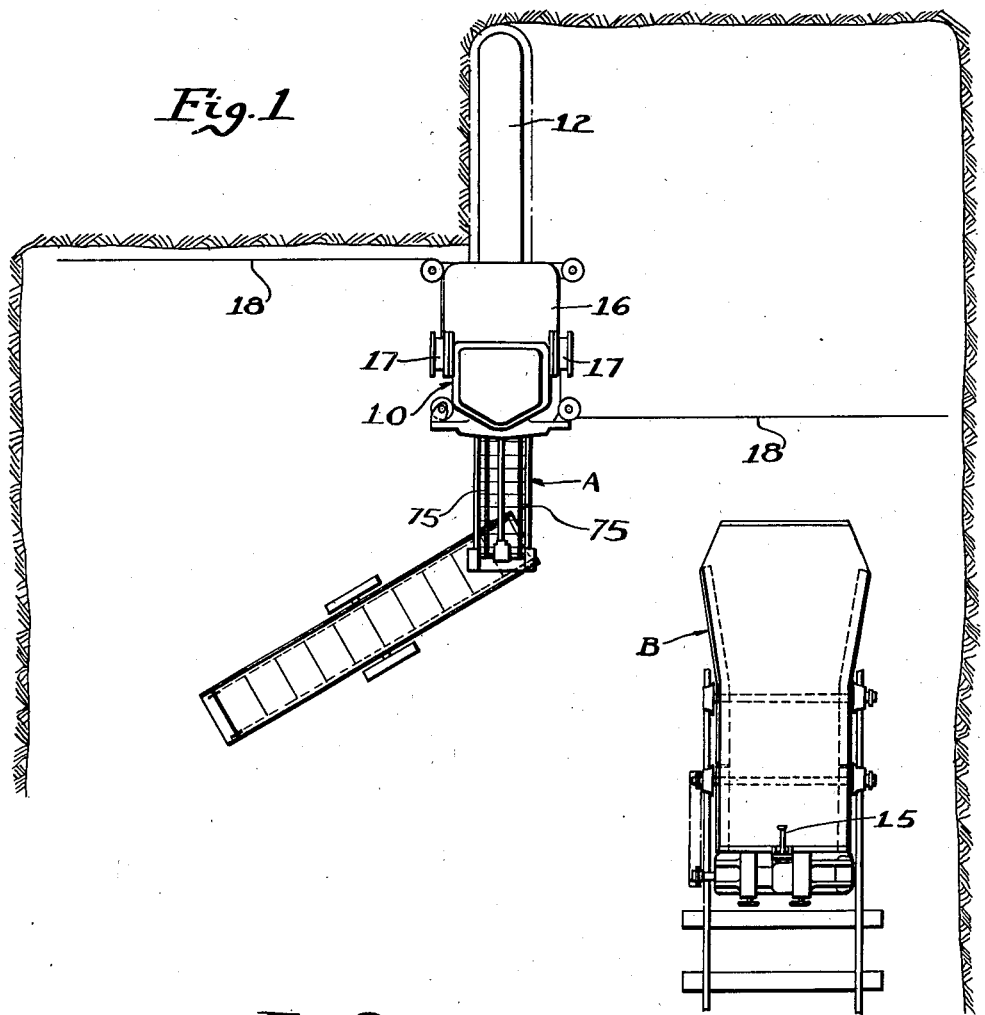
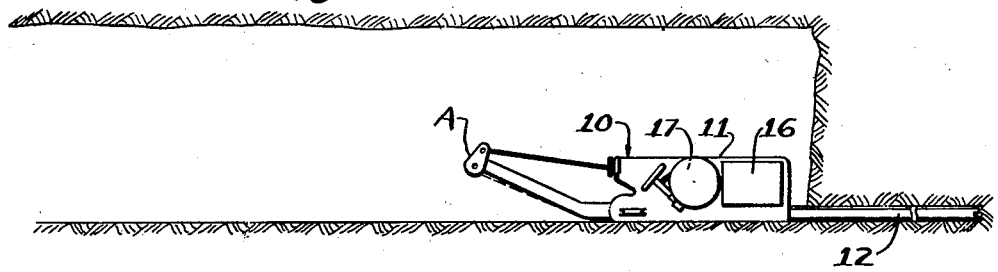
INVENTOR
Thomas E. Pray
BY
Clarence F. Poole
ATTORNEY

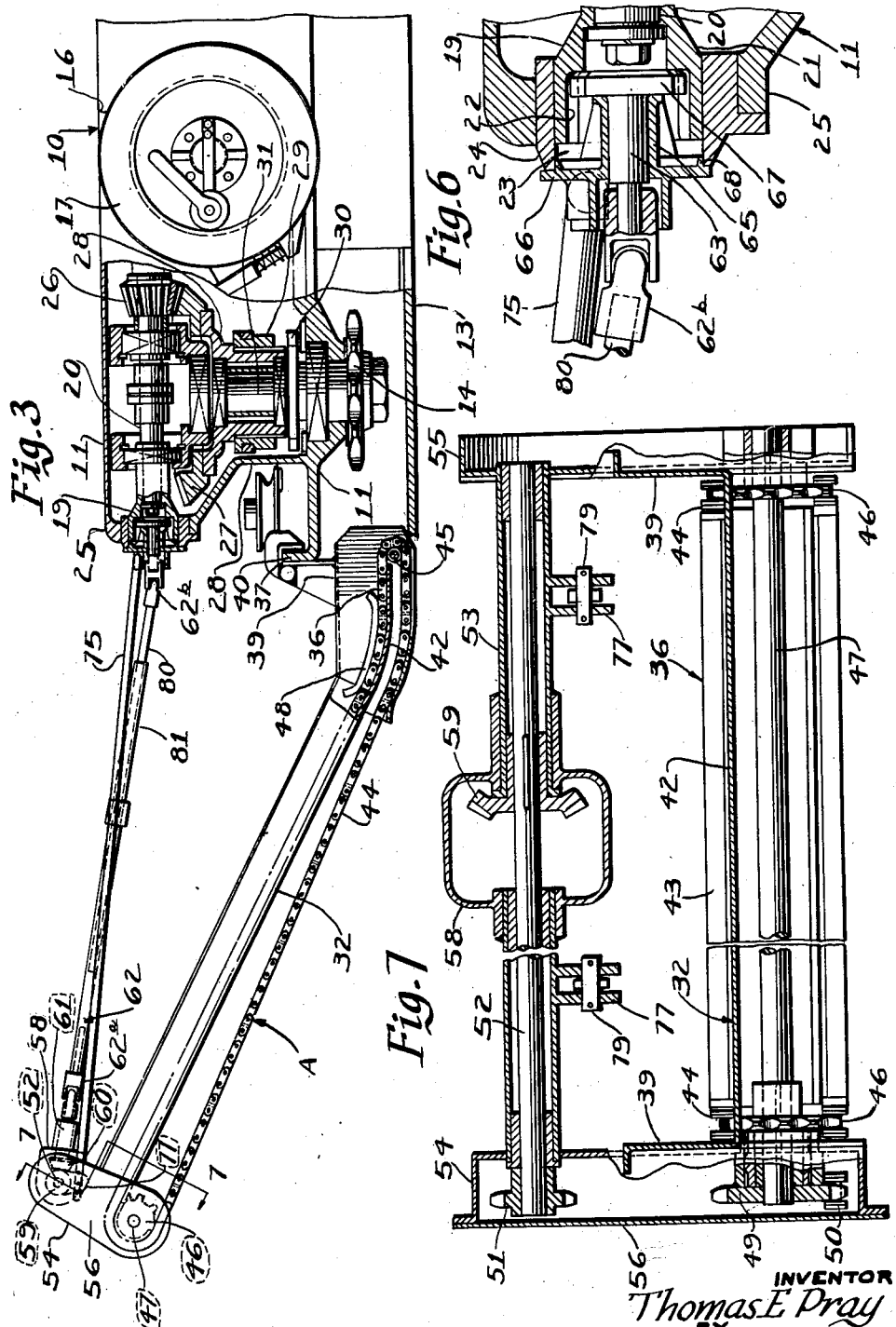

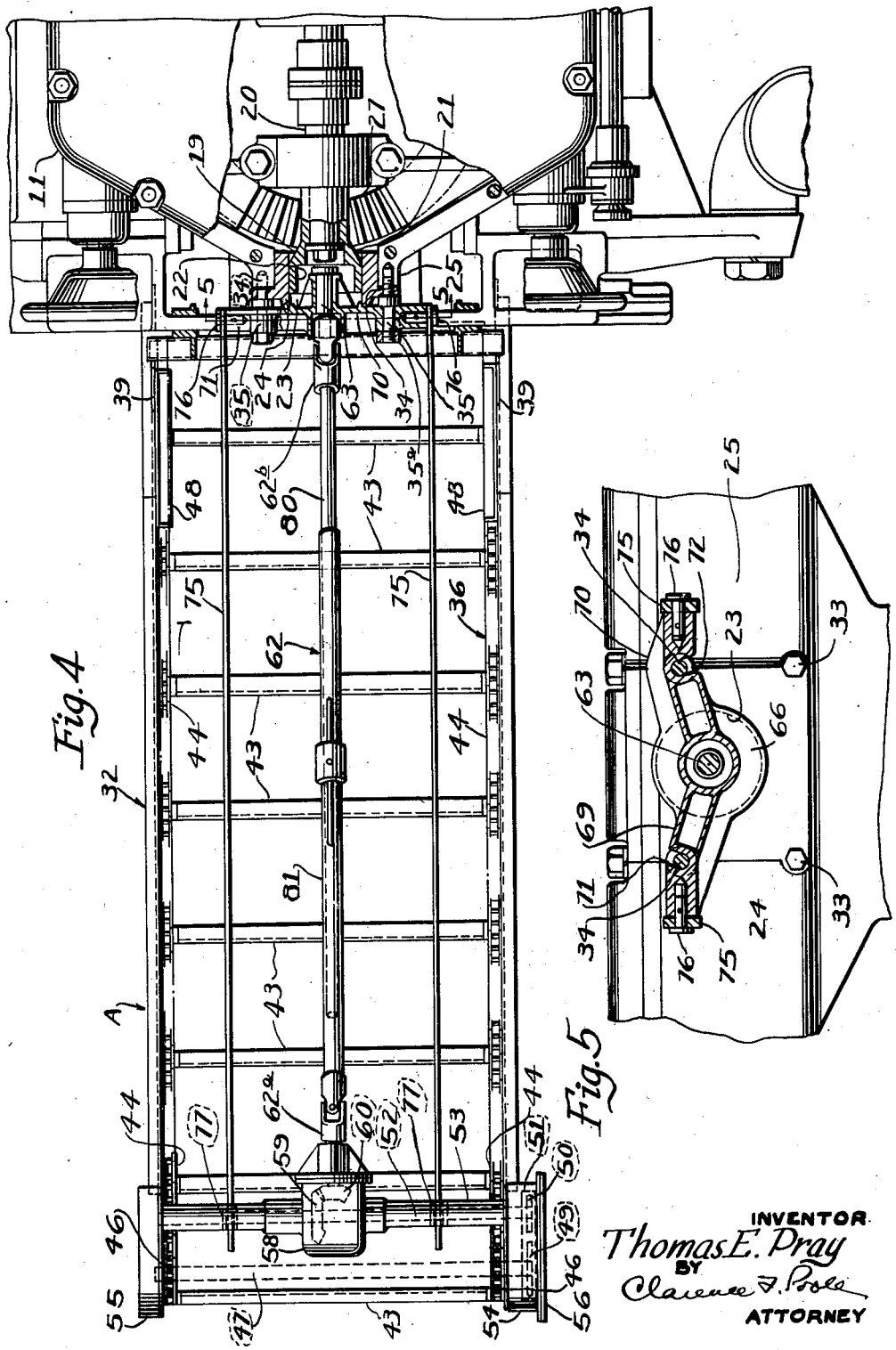

Patented Apr. 7, 1942

2,278,796

UNITED STATES PATENT OFFICE 2,278,796

SLACK OR CUTTINGS REMOVING ATTACHMENT FOR KERF-CUTTING MACHINES OF THE ROOM AND PILLAR TYPE

Thomas E. Pray, Chicago, Ill., assignor to Goodman Manufacturing Company, Chicago, Ill., a corporation of Illinois Application October 30, 1940, Serial No. 363,394

5 Claims. (Cl. 262—30)

This invention relates to improvements in slack or cuttings removing attachments for kerf-cutting machines of the room and pillar type, and has for its principal object to provide a relatively light, labor-saving device of the character described, capable of easy attachment to a kerf-cutting machine of standard construction and driven by power from the latter so as to remove the cuttings mechanically from the rear of the machine.

One of the most laborious requirements in the operation of kerf-cutting machines is that of clearing the slack or cuttings from the machine as they are ejected at the rear end by the cutter chain. This work, usually done by hand shoveling, is particularly difficult under low roof conditions in a mine. Moreover, since the development of systems for removing the coal by conveyers which are usually disposed in close proximity to the working face, it is difficult, and sometimes impossible, to manipulate a shovel properly in the narrow space left between the rear end of the kerf-cutting machine and the conveyer.

In carrying out my invention, I provide an attachment consisting of a flight conveyer which can be attached to the rear end of a kerf-cutting machine so as to be driven by power from the motor of said machine, said conveyer being disposed with its lower end in position to receive the cuttings as they are discharged by the cutter chain at the rear end of the machine, and with its rear end inclined upwardly to clear the cuttings mechanically from the rear of the machine, and, if desired, to discharge them onto another conveyer for removal to a more remote part of the mine.

The conveyer is preferably in the form of an attachment to be applied to the kerf-cutting machine only at such times as the latter is being employed in actual cutting operations. Thus at other times the cutting machine can be maneuvered about the mine floor, and transported on its truck in the usual manner, without being hampered by the added length of the slack-removing device.

The invention may best be understood by reference to the accompanying drawings, in which:

Figure 1 is a plan view showing a mine section in which a kerf-cutting machine is operating, with a slack-removing device constructed in accordance with my invention attached to the machine, in position to load the cuttings onto an auxiliary conveyer;

Figure 2 is a side view of the kerf-cutting machine and slack remover shown in Figure 1;

Figure 3 is an enlarged fragmentary side view showing the rear end of the kerf-cutting machine, with the slack removing device attached thereto, with parts of the kerf-cutting machine shown in longitudinal section;

Figure 4 is a fragmentary plan view of the parts shown in Figure 3, but drawn to a larger scale;

Figure 5 is a detail section taken on line 5—5 of Figure 4;

Figure 6 is an enlarged detail section showing the drive coupling in longitudinal section; and Figure 7 is a detail section taken on line 7—7 of Figure 3.

Referring now to details of the embodiment of my invention illustrated in the drawings, the slack removing device indicated generally at A is shown as applied to a kerf-cutting machine 10 of well known construction and operation, comprising a main frame 11 having a chain-carrying cutter bar 12 projecting forwardly from the main frame. Said cutter bar operates in a channel formed between the main frame and a base plate 13, said channel opening to the rear end of the machine. The cutter chain is driven from a chain sprocket 14 (Figure 3) operatively connected with a motor 16 disposed at the front of the frame. Flexible feeding means is also provided as usual, herein comprising a pair of winding drums 17, 17 at opposite sides of the machine, suitably driven from the motor 16, and having cables 18, 18 thereon adapted to be anchored at suitable points along the working face to feed the cutter bar to the coal.

Kerf-cutting machines of the character herein described are usually transported from place to place on a wheeled truck such as indicated at B in Figure 1, and while mounted on said truck, the latter is driven by power from the motor 16 of said machine. For this purpose, the running gear of the truck B is connected as usual, by suitable gearing to a tongue 15, which is moved into operative engagement with a coupling member 19 at the rear end of the mining machine when the latter is mounted on said truck. In the form of machine herein illustrated, the coupling member 19 is fixed on a longitudinal shaft 20 driven from the motor 16 through suitable gearing (not shown). Said coupling member consists of a hub 21 having an enlarged socket 22 rotatably mounted in an annular opening 23 formed in a bearing plate 24 mounted in a gear casing 25 at the rear end of the main frame 11. The shaft 20 may also drive the cutter chain sprocket 14 of the machine through bevel pinion 26, bevel gear 27 on hub 28, and a sliding clutch member 29 on said hub, having selective engagement with clutch teeth 30 on sprocket shaft 31.

The bearing plate 24 is detachably secured to the gear casing 25, as by bolts 33, 33 and 34, 34, the last named pair of bolts having threaded extensions 35, 35 thereon which provide means for securing the slack removing device to the mining machine, as will presently appear.

It will be understood that in the usual operation of a kerf-cutting machine of the kind illustrated herein, it is transported from one working place in the mine to another on the wheeled truck B, with the tongue 15 of said truck engaged in the coupling member 19 of the mining machine, so that the truck is propelled by power from the mining machine motor 16. Whenever the machine is to be used for cutting coal, however, it is entirely withdrawn from the truck, and is moved over the mine floor on its own bottom by means of the cables 18, 18. Thus the slack removing device is only attached to the rear end of the kerf-cutting machine during actual cutting, with a conveyer drive mechanism in operative engagement with the coupling member 19 so as to be driven from the cutting machine motor 16.

Referring now more particularly to details of the slack removing device A, which forms the subject matter of the present invention, said device consists of an elongated frame 32 of a generally trough-like form, carrying an endless conveyer member indicated generally at 36 extending the length thereof. The frame 32 is adapted to be supported at an upwardly inclined angle when attached to the kerf-cutting machine, with its front end engaging the rear end of the base plate 13 in position to receive the cuttings as they are discharged from the rear end of the cutter chain channel, as seen in Figure 3.

The lower or front end of the conveyer frame 32 is detachably mounted relative to the machine frame 11, as by hooks 37, 37 projecting upwardly from side walls 39 of the conveyer frame, and engageable with an upwardly flanged extension 40 along the rear end of the machine frame, above the rearwardly opening discharge end of the cutter chain channel.

The side walls 39, 39 of the frame 32 are rigidly connected together by a bottom pan 42 along which the upper reach of the endless conveyer 36 is guided for conveying action. Said conveyer is of the usual endless flight type, including transverse flights 43, connected between conveyer chains 44, 44 along opposite sides thereof. The conveyer chains are trained over an idler shaft 45 at the lower front end of the frame, and over sprockets 46, 46 on cross shaft 47 journaled at the upper end of said frame. In the form shown, the frame 32, together with its bottom pan 42, is curved adjacent its lower end to form a relatively short, horizontal conveyer section. A pair of curved chain guides 48, 48 are mounted on the side walls 39 to retain the upper reach of the conveyer in proximity to the bottom pan 42 along the curved portion of the latter.

The sprocket shaft 47 at the upper end of the frame has a drive sprocket 49 at one end thereof, connected by chain 50 to a sprocket 51 on a cross shaft 52. Said cross shaft is journaled at opposite ends in a tubular cross member 53, having its opposite ends rigidly supported in upright supporting brackets 54 and 55 which in turn are rigidly supported on the side walls 39, 39 of the conveyer frame. The bracket 54 adjacent the drive chain 50 is preferably in the form of a casing closed by an end plate 56, to provide a housing for said chain, as shown in Figure 7.

The tubular cross member 53 has an enlarged gear housing 58 intermediate its ends, within which is enclosed bevel gears 59 and 60, connecting the shaft 52 with a stub shaft 61 extending through the front of said housing. An extension shaft 62 is connected at its rear end to the stub shaft 61 by a universal joint 62a, and is connected at its front end to a stub shaft 63 by a universal joint 62b. The stub shaft 63 is rotatably mounted in a bearing sleeve 65 of a cover plate 66, and has a T-shaped head 67 forming a tongue adapted to fit in the socket 22 of coupling member 19, when the slack removing device is coupled in driving engagement with the mining machine.

The cover plate 66 is provided with an annular flange 68 on its inner face, adapted to fit in the annular opening 23 of bearing plate 24. Said cover plate provides means for quick attachment and detachment of the slack removing device, and to this end has two arms 69 and 70 integral therewith and projecting laterally at opposite sides thereof. One of said arms, as for instance arm 69, has a slot 71 at one side thereof opening upwardly, and the other arm 70 has a slot 72 opening downwardly. The arrangement is such that by partial rotation of cover plate 66 relative to bearing plate 24, the outer ends 35, 35 of bolts 34, 34 (which are fixed to the gear casing 25 of the mining machine, as previously described) will be engaged in the slots 71 and 72 of arms 69 and 70, respectively. The arms can then be secured in place by nuts 35a, 35a on said bolt ends 35, 35.

The rear end of the slack removing attachment is connected to the cover plate 66 and supported at the proper inclination relative to the mining machine by a pair of links 75, 75, the front ends of which are pivotally connected at the outer ends of the arms 69 and 70, respectively, by pins 76, 76. The rear ends of said links are adjustably connected to brackets 77, 77, herein shown as depending from the tubular cross shaft 53 at the rear of the conveyer frame. Said links are provided with a plurality of holes 78 adjacent their rear ends, which can be selectively engaged by pins 79, 79 in the brackets 77, 77 to vary the inclination of the conveyer and the resulting point of delivery of the slack or cuttings, as desired. The drive shaft 62 is of the usual telescopic form including an inner member 80 and an outer sleeve 81, adjustable longitudinally of each other to compensate for any changes in length required.

The use and operation of the slack removing device above described may now be explained as follows: The device is attached to the mining machine 10 only at such times as said machine is dismounted from its transporting truck B, and preferably after the machine has been moved into cutting position relative to the working face of the mine. Thus the slack removing device does not add to the overall length or height of the cutting machine, so as to hamper its usual movements while it is being transported from place to place on its truck, or while it is being dragged on its own bottom up to the working face. When the machine is ready to start actual cutting, however, the attachment is readily secured to the rear of the machine by attachment of the hooks 37, 37 and the cover plate 66 to the rear of the cutting machine, as already described. Attachment of the cover plate not only establishes the driving connection between the conveyer and the cutting machine motor, but completes the supporting connection for the upper end of the conveyer frame through the links 75, 75.

The attachment can be used in ordinary cutting operation for the purpose of discharging the cuttings on the mine floor at a distance from the rear end of the cutting machine. It can also be used to discharge the cuttings into an auxiliary conveyer for removal to a more remote point, as indicated in Figure 1 of the drawings. It is particularly advantageous in certain mining systems employing a loading conveyer disposed along the working face in close proximity thereto, so as to leave limited space for operation of the cutting machine between the conveyer and the mine wall. In such a system, the operation of the cutting machine in such close quarters is greatly facilitated by removing the cuttings mechanically and discharging them on the face conveyer, or at a point beyond such face conveyer, as desired. But in all cases, the slack removing device eliminates hand shoveling of the cuttings, and helps to speed up cutting operations.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In combination with a kerf-cutting machine including a frame having a cuttings passage therethrough, a motor on said frame having a power coupling member adapted for detachable driving connection with a mining machine truck, and a chain carrying cutter bar in said cuttings passage driven by said motor and adapted to discharge the cuttings at one end of said passage, a cuttings removing device comprising a frame having a conveyer extending therealong, drive means for said conveyer, and means for detachably connecting said conveyer frame to said cutting machine frame so as to be wholly supported by the latter, with one end of said conveyer in cuttings-receiving relation at the discharge end of the cuttings passage of said kerf-cutting machine, said detachable connecting means including a coupling support connectible to said cutting machine frame, said coupling support having a conveyer driving member mounted thereon in position to be engageable with said coupling member, and link means connecting said conveyer frame and said coupling support.

2. A cuttings removing device adapted for detachable connection with a kerf-cutting machine, comprising a frame having an endless conveyer thereon, drive means for said conveyer including a rotatable extension shaft having coupling means at its forward end adapted for detachable driving connection with a power-driven coupling member on the kerf-cutting machine, means for detachably connecting the front end of said conveyer frame in cuttings-receiving relation with said kerf-cutting machine, and detachable tension means independent of said shaft for supporting the rear portion of said conveyer frame relative to said cutting machine.

3. A cuttings removing device adapted for detachable connection with a kerf-cutting machine, comprising a frame having an endless conveyer thereon, drive means for said conveyer adjacent the rear end of said frame including a rotatable telescopic extension shaft having coupling means at its forward end adapted for detachable driving connection with a power-driven coupling member on the kerf-cutting machine, means for detachably connecting the front end of said conveyer frame in cuttings-receiving relation with said kerf-cutting machine, and detachable linkage means adjustable in length for supporting the rear portion of said conveyer frame at varying elevated angles relative to said cutting machine.

4. A cuttings removing device adapted for detachable connection to the kerf-cutting machine, comprising a frame having an endless conveyer thereon, drive means for said conveyer adjacent the outer end of said frame including a rotatable extension shaft having coupling means at its forward end adapted for detachable driving connection with a power driven coupling member on the kerf-cutting machine, a coupling support for said coupling means adapted for detachable supporting connection with said kerf-cutting machine, linkage means connecting said coupling support with the rear end of said frame, and means for detachably connecting the front end of said conveyer frame in cuttings-receiving relation with said cutting machine.

5. In a cuttings removing device adapted for detachable connection with a kerf-cutting machine, a frame having an endless conveyer thereon, drive means for said conveyer including a rotatable extension shaft having coupling means at its forward end adapted for detachable driving connection with a power driven coupling member on the kerf-cutting machine, a detachable bearing support for said coupling means having two laterally extending arms each having means intermediate its ends for detachable connection with said kerf-cutting machine, and each having a link pivotally connected adjacent its outer end and extending rearwardly for supporting connection with the rear end of said conveyer frame.

THOMAS E. PRAY.